United States Patent
Gautama

(10) Patent No.: US 9,967,404 B2
(45) Date of Patent: May 8, 2018

(54) ECHO CONTROLLER

(71) Applicant: NXP B.V., Eindhoven (NL)

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/142,304

(22) Filed: Apr. 29, 2016

(65) Prior Publication Data

US 2016/0352915 A1 Dec. 1, 2016

(30) Foreign Application Priority Data

May 28, 2015 (EP) .................................... 15169681

(51) Int. Cl.
| | |
|---|---|
| *H04M 9/08* | (2006.01) |
| *H04R 3/02* | (2006.01) |
| *H04R 29/00* | (2006.01) |
| *G10L 21/0208* | (2013.01) |

(52) U.S. Cl.
CPC .............. *H04M 9/082* (2013.01); *H04R 3/02* (2013.01); *H04R 29/001* (2013.01); *G10L 2021/02082* (2013.01)

(58) Field of Classification Search
CPC ......... G10L 2021/02082; H04M 9/082; H04R 3/02; H04R 29/001
USPC ......................................... 379/406.01–406.16
See application file for complete search history.

(56) References Cited

U.S. PATENT DOCUMENTS

| | | | |
|---|---|---|---|
| 2005/0013455 A1* | 1/2005 | Loeb ...................... | H04R 17/00 381/191 |
| 2007/0140058 A1* | 6/2007 | McIntosh ................. | H04R 3/04 367/140 |
| 2010/0128868 A1* | 5/2010 | Suppappola .......... | H04M 9/082 379/406.06 |
| 2014/0135078 A1 | 5/2014 | Nigam et al. | |
| 2014/0270207 A1 | 9/2014 | Vinayak | |
| 2014/0363008 A1* | 12/2014 | Chen .................... | G10K 11/002 381/66 |
| 2015/0181318 A1 | 6/2015 | Gautama et al. | |

(Continued)

FOREIGN PATENT DOCUMENTS

| | | |
|---|---|---|
| EP | 1 912 468 A1 | 4/2008 |
| EP | 2 456 229 A1 | 5/2012 |
| EP | 2 575 375 A1 | 4/2013 |

(Continued)

OTHER PUBLICATIONS

Extended European Search Report for Patent Appln. No. 15169681.2 (dated Nov. 26, 2015).

*Primary Examiner* — Hemant Patel

(57) ABSTRACT

The present disclosure relates to an echo controller, for use with a microphone and a device comprising a loudspeaker, the echo controller comprising: a sensor with sensing capabilities configured to provide displacement-signalling representative of a displacement of a diaphragm of the loudspeaker, wherein the sensing capabilities of the sensor are isolated from an external environment of the device; and a cancellation block configured to determine a cancellation-signal based on the displacement-signalling; wherein the cancellation-signal is for adapting a received-signal provided by the microphone to determine an echo-cancelled-signal.

13 Claims, 1 Drawing Sheet

(56) References Cited

U.S. PATENT DOCUMENTS

2015/0229353 A1* 8/2015 Berthelsen ............ H04M 9/082
  379/406.08
2016/0150337 A1* 5/2016 Nandy .................... H04R 3/02
  381/66

FOREIGN PATENT DOCUMENTS

EP  2 811 728 A1  12/2014
WO  WO-96/26592 A1  8/1996

* cited by examiner

Figure 1
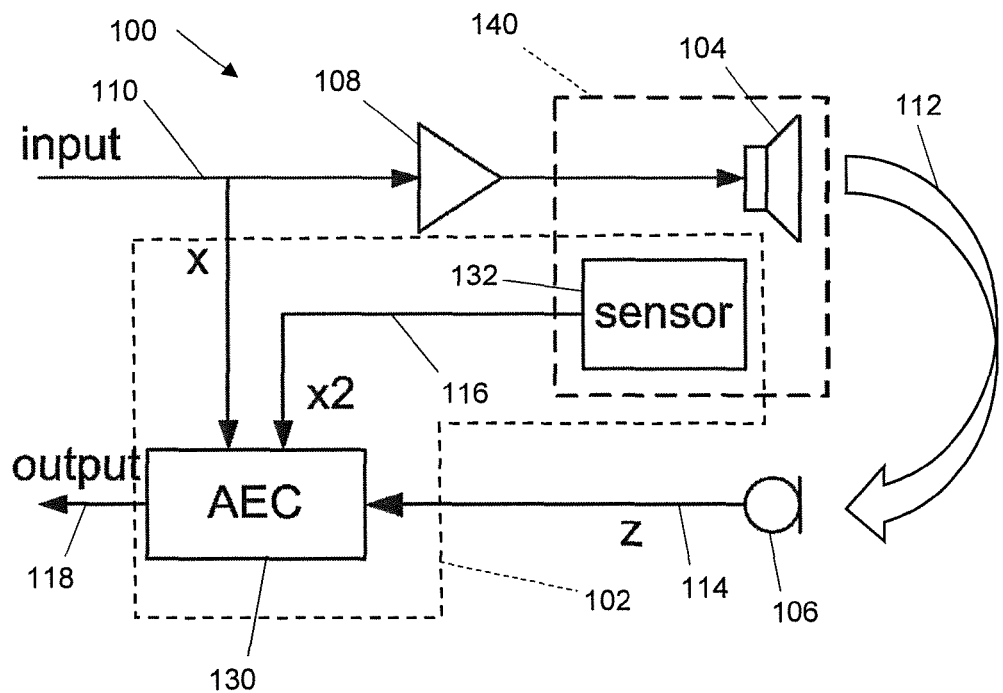
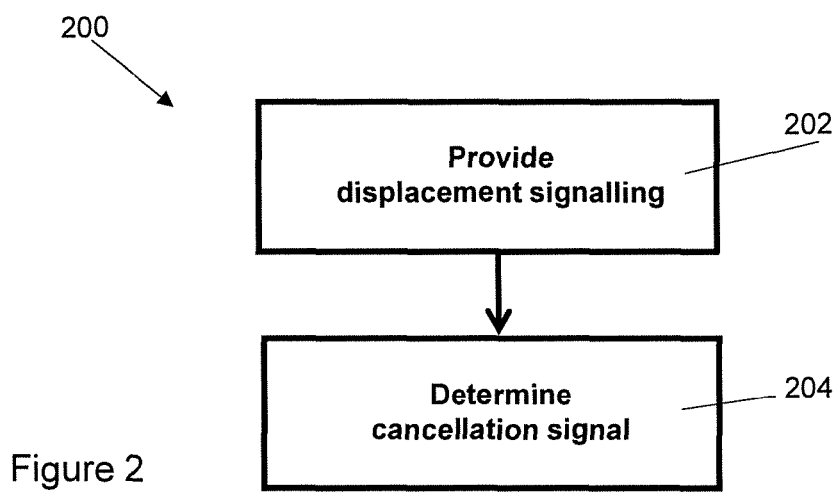
Figure 2

ECHO CONTROLLER

CROSS-REFERENCE TO RELATED APPLICATIONS

This application claims the priority under 35 U.S.C. § 119 of European patent application no. 15169681.2, filed May 28, 2015 the contents of which are incorporated by reference herein.

The present disclosure relates to an echo controller.

In a system comprising a loudspeaker and a microphone, the microphone may detect acoustic signals broadcast by the loudspeaker. In a communications device, for example, the loudspeaker may broadcast speech provided by a remote person and the microphone may detect both speech provided by a user of the device (a local person) and an echo of the speech provided by the remote person that is reproduced by the loudspeaker.

According to a first aspect of the present disclosure there is provided an echo controller, for use with a microphone and a device comprising a loudspeaker, the echo controller comprising: a sensor with sensing capabilities configured to provide displacement-signalling representative of a displacement of a diaphragm of the loudspeaker, wherein the sensing capabilities of the sensor are isolated from an external environment of the device; and a cancellation block configured to determine a cancellation-signal based on the displacement-signalling; wherein the cancellation-signal is for adapting a received-signal provided by the microphone to determine an echo-cancelled-signal.

Displacement-signalling may provide an accurate representation of the behaviour of the loudspeaker, including any non-linearity in the performance of the loudspeaker. The microphone may receive an echo of the acoustic output of the loudspeaker, including such non-linearities, in addition to a desired acoustic input such as a user's speech. The cancellation-signal may thereby advantageously provide for removal of the loudspeaker echo from the received signal from the microphone, without the computational complexity of computing a model of the loudspeaker's performance that comprises expected non-linearities in loudspeaker behaviour. Further, since the cancellation-signal is based on the actual behaviour of the loudspeaker, the cancellation-signal may provide more accurate or robust echo cancellation than a system based on a non-linear model of loudspeaker behaviour which may not accurately represent the actual behaviour of the loudspeaker in all situations.

In one or more embodiments the cancellation block may be configured to: receive a driver signal for the loudspeaker, and determine the cancellation-signal in accordance with the driver signal.

In one or more embodiments the cancellation block may also be configured to determine the cancellation-signal in accordance with the received-signal.

In one or more embodiments the sensor may be configured to measure a loudspeaker current flowing into a loudspeaker voice coil and to provide the displacement-signalling in accordance with the loudspeaker current.

In one or more embodiments the sensor may be configured to measure a loudspeaker voltage and to provide the displacement-signalling in accordance with the loudspeaker voltage.

In one or more embodiments the echo controller may be further configured to introduce a measurement signal of a predetermined frequency into an input signal for the loudspeaker, measure a measured-signal in a frequency band comprising the predetermined frequency, and provide the displacement-signalling in accordance with the measured-signal.

In one or more embodiments the measured-signal may be representative of one or more of: a loudspeaker current; a loudspeaker voltage; an acoustic signal; and a pressure signal.

In one or more embodiments the measurement signal may comprise a pilot tone of predetermined frequency and wherein optionally the predetermined frequency may be outside of an audible range.

In one or more embodiments the sensor may comprise a motion sensor coupled to the diaphragm of the loudspeaker, and wherein the motion sensor may be configured to provide the displacement-signalling in accordance with sensed motion of the diaphragm.

In one or more embodiments the echo controller may further comprise an echo-reduction block configured to determine the echo-cancelled-signal in accordance with the received-signal and the cancellation-signal.

In one or more embodiments the cancellation-signal may be representative of a departure from linearity of the received-signal with respect to the driver signal.

In one or more embodiments the echo controller may be further configured to determine a parameter in accordance with the displacement-signalling, wherein the parameter is for adapting one or more of an algorithm, a formula, a database and a look-up table, for processing: the received-signal, provided by the microphone, to determine the echo-cancelled-signal; and/or the displacement-signalling to determine the cancellation-signal.

In one or more embodiments the cancellation-signal may be configured to be representative of an acoustic output of the loudspeaker, the received signal comprises information representative of the acoustic output, and the echo-cancelled-signal may be determined to comprise a reduced intensity representation of the acoustic output compared to the received signal.

In one or more embodiments a device may comprise a loudspeaker and the echo controller.

In one or more embodiments a device may further comprise a housing coupled to the loudspeaker and configured to provide an interior volume containing the sensor, wherein the sensor may be a microphone or a pressure sensor and the housing may be configured to isolate the sensor from acoustic signals originating from the external environment of the device.

In one or more embodiments the housing may comprise a material configured to one or more of: absorb acoustic signals originating from the external environment of the housing; and reflect acoustic signals originating from the external environment of the housing.

According to a further aspect of the present disclosure there is provided a method of controlling an echo, the method for use with a microphone and a device comprising a loudspeaker, comprising a first step of a sensor providing displacement-signalling representative of a displacement of a diaphragm of the loudspeaker, wherein the sensing capabilities of the sensor are isolated from an external environment of the device; and a second step of determining a cancellation-signal based on the displacement-signalling; wherein the cancellation-signal is for adapting a received-signal provided by the microphone to determine an echo-cancelled-signal.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The Figures and Detailed Description that follow also exemplify various example embodiments. Various example embodiments may be more completely understood in consideration of the following Detailed Description in connection with the accompanying Drawings.

BRIEF DESCRIPTION OF DRAWINGS

One of more embodiments will now be described by way of example only with reference to the accompanying drawings in which:

FIG. 1 shows an example embodiment of an echo controller and an associated loudspeaker and microphone; and FIG. 2 shows an example embodiment of a method for controlling an echo controller.

DETAIL DESCRIPTION

The instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services.

As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

In electronic devices, such as for example communications devices, a microphone registers the desired near-end speech, but also an echo of the far-end signal. The near-end speech is the speech provided by a user (a local person) of the communications device while the far-end signal may comprise the speech of a remote person with whom the user is communicating. Since the microphone may detect the far-end signal as an echo of the acoustic output of a loudspeaker in the device, the microphone may provide an echo of the far-end signal back to the remote user. Such echo signals may be advantageously removed or reduced in order to prevent the remote person from receiving an echo of what they have just said.

In devices with a small loudspeaker, the loudspeakers can be driven into nonlinear behaviour in order to be able to reproduce the far-end signal at a sufficiently loud level. When this happens, the microphone signal contains a nonlinear echo, which contains the nonlinear distortions generated by the loudspeaker. According to the present disclosure a sensor that registers a signal that is tightly linked to the loudspeaker behaviour may be used to improve acoustic echo cancellation performance by taking into account the actual non-linear behaviour of the loudspeaker when it deviates from an expected reproduction of the far-end signal, for example a linear prediction.

A communications device (smartphone, tablet, or other) may have at least one loudspeaker and at least one microphone. Since the output of the loudspeaker may be registered by the microphone, there may be an echo on the microphone signal, which may advantageously be cancelled or reduced.

In acoustic echo cancellation (AEC) systems, a reference signal, x, (for example an audio signal that is sent to the amplifier and loudspeaker of the communications device, which is an example of a far-end signal) may be used to estimate the expected echo signal, $\hat{y}$, that is registered by the microphone of the communications device. This expected echo signal, $\hat{y}$, can then be removed from the microphone signal, z. Techniques such as normalised least-mean-squares, and spectral subtraction can be used for acoustic echo cancellation operations. Other sensors, such as accelerometers, may also be used for generating a reference signal, either in combination with, or as a replacement for the traditional reference signal.

In some AEC systems, the presence of loudspeaker-related (and other) nonlinearities may be problematic, as they may not be modelled by linear systems. Post-processing steps in the frequency domain may be necessary to spectrally over-subtract an echo estimate from the microphone signal, because the echo estimate does not contain the nonlinear distortions from the loudspeaker. The more nonlinear distortions that are present, the more over-subtraction needs to be done, leading to a higher attenuation of the desired speech in double-talk situations (when near-end and far-end are talking simultaneously).

The present disclosure relates to measuring (directly or indirectly) the behaviour of the loudspeaker, and yielding a reference signal that contains the nonlinearities generated by the loudspeaker. In this way, a more accurate echo estimate may be obtained, and less over-subtraction may be required. This leads to a better performing AEC system.

The present disclosure provides an acoustic echo cancellation system that uses an additional sensor that registers a signal that is tightly linked with the behaviour of the loudspeaker. This has the advantage that the AEC system has a better estimate of the nonlinear distortions that originate from the nonlinear behaviour of the loudspeaker, and/or nonlinear behaviour of any other components associated with the loudspeaker such as amplifiers, and that are present on the microphone signal, leading to a better AEC (double-talk) performance. The additional sensor can be directly coupled to the loudspeaker behaviour, and the sensor output can be predominantly determined by the loudspeaker behaviour (unlike, for example, the traditional microphone in a smartphone, which also picks up ambient sounds and/or speech). The latter is very important for AEC systems, since the desired speech should be preserved: if the echo estimate (which is derived from the reference signal and/or the sensor output signal) contains small portions of the desired speech signal, then the desired speech signal may be disadvantageously attenuated by the AEC processing.

FIG. 1 shows an example embodiment of a system 100 comprising an echo controller 102, and an associated loudspeaker 104 and an associated microphone 106. The echo controller 102 includes a sensor 132 and at least some of the functionality of an acoustic echo cancellation module (AEC) 130. In this example, a device 140 comprises the loudspeaker 104. For example, the device 140 may be a smartphone or a tablet, or may be an audio sub-component of a smartphone or a tablet. In some examples, the device 140 may be the loudspeaker 104, while in other examples the device 140 may comprise the loudspeaker 104 and an additional component or components, such as a housing. In this example, the device 140 also comprises the sensor 132. However, it will be appreciated that in other examples the sensor 132 may be remote from the device 140 while still being coupled to the loudspeaker 104 in respect of the sensor's 132 sensing capabilities.

In this example, the system 100 receives a system input signal 110, which may also be called a reference signal or a driver signal. The system 100 determines an output signal 118, which may also be called an echo-cancelled-signal.

The system input signal 110 of the system is sent to an input terminal of an amplifier 108. An output terminal of the amplifier 108 is connected to the loudspeaker 104. It will be appreciated that in some examples (not shown) the loudspeaker may comprise a loudspeaker system comprising a plurality of loudspeakers. The microphone 106 registers an acoustical signal, which contains the desired speech and a portion that corresponds to an 'echo' 112 representation of the system input signal 110 as it is output by the loudspeaker 104. The microphone provides a microphone signal 114 as an output.

The AEC module 130 receives displacement-signalling 116 from the sensor 132 as an additional reference signal. The displacement-signalling 116 is labelled 'x2' in FIG. 1. The sensor 132 has sensing capabilities configured to provide the displacement-signalling 116 representative of a displacement of a diaphragm of the loudspeaker 104. Many different types of loudspeaker exist. Generally, a loudspeaker is a device for converting electrical signals into acoustic signals by displacement of a mechanical component which may be called the diaphragm. The displacement-signalling 116 is representative of the distance through which at least some part of the diaphragm has been displaced relative to some reference position.

The sensing capabilities of the sensor 132 may be isolated from the external environment of the device 140. In this way, the sensor can detect or measure performance of the loudspeaker independently of any sounds that are made externally of the device 140. The device 140 may comprise a casing attached to the loudspeaker 104 that defines an internal volume of the device that contains at least a portion of the loudspeaker 104. Thereby, any volume not comprising the internal volume of the device may be considered an external environment of the device.

The property of being isolated from the external environment may not be absolute. In some examples the device may be configured to attenuate any signalling, present in the external environment, which is sensed by the sensor 132. That is, a small amount of sensing of conditions in the external environment may occur in some examples. In some embodiments the sensing capabilities of the sensor 132 may only be coupled to the loudspeaker 104 to any significant extent.

The acoustic echo cancellation module (AEC) 130 in this example also receives the system input signal 110 as a reference signal. In FIG. 1, the system input signal 110 is labelled 'x'. The AEC module 130 also receives the microphone signal 114 as an input. The microphone signal 114 is labelled 'z' in FIG. 1, and may also be referred to as a 'received-signal'.

The echo controller 102 comprises a cancellation block (not shown) that can determine a cancellation-signal based on the displacement-signalling 116 received from the sensor 132. In this example, the cancellation block is provided as a sub-module of the AEC module 130. Therefore, the cancellation-signal can be considered as a signal that is internal to the AEC module 130 and is not visible in FIG. 1. It will be appreciated that, in other examples the cancellation block may be provided as a component separated from the AEC module 130.

The cancellation-signal in this example is representative of an acoustic output of the loudspeaker 104. The cancellation-signal is for adapting the received-signal 114 provided by the microphone 106 to determine the echo-cancelled-signal 118. It will be appreciated that, in examples where the cancellation block is provided externally with respect to the AEC module 130, the cancellation-signal will be suitable for communication to the AEC module 130 in order to configure the AEC module 130 to provide the echo-cancelled-signal 118.

In this way, the cancellation block of the AEC module 130 can remove, or reduce the effect of, the echo signal 112 such that the output signal (the echo-cancelled-signal 118) contains the desired speech signal without the echo 112 or with an attenuated representation of the echo 112.

In this example the AEC module 130 also uses the system input signal 110 to determine the echo-cancelled-signal 118. For example, the AEC module 130 may comprise an echo-reduction block (not shown) for applying the cancellation-signal to the received-signal 114 in order to determine the echo-cancelled-signal 118. The AEC module 130 can determine the echo-cancelled-signal 118 by subtracting the cancellation-signal from the received-signal 114. In this way, the echo-cancelled-signal 118 may comprise a reduced intensity representation of the acoustic output of the loudspeaker 104 compared to the received-signal 114.

In some examples the cancellation-signal may be representative of a departure from linearity of the received-signal 114 with respect to the system input signal 110. Since the microphone 106 may receive the echo 112, the received-signal 114 may comprise a representation of the echo 112.

This representation will comprise any non-linear distortions that the loudspeaker 104 has produced based on the system input signal 110. By providing a representation of a departure from linearity of the behaviour of the loudspeaker 104, the cancellation-signal may advantageously be used to remove or reduce the presence of non-linear components of the echo 112 present in the received-signal 114 from the echo-cancelled-signal 118.

One example of the sensor 132 is a laser displacement sensor, which measures the loudspeaker diaphragm displacement. This is a direct measurement of the loudspeaker behaviour, which includes all loudspeaker nonlinearities that will be present in the microphone signal 114. A sensor, such as a laser displacement sensor, configured to provide a direct measurement of the loudspeaker diaphragm displacement may be considered isolated from the external environment of the device 140 because such a sensor 132 is only measuring the behaviour of the loudspeaker 104.

Another example of the sensor 132 is a current sensor, which measures the electrical current that flows into the loudspeaker voice coil. Since a loudspeaker can be considered to be any device that converts electrical signalling into acoustic signalling it will be appreciated that an electrical component will be present in the loudspeaker to achieve this signal conversion; this component may be referred to as a voice coil. The current can, for example, be measured using a small shunt resistance in series with the loudspeaker 104. The voltage across the shunt resistance is thereby related to the voice coil current. Therefore, the sensor 132 may be configured to measure a loudspeaker current flowing into the loudspeaker voice coil and to provide the displacement-signalling 116 in accordance with the loudspeaker current. Such a current sensor may also be considered to be isolated from the external environment of the device 140 because it is not electrically coupled to any sources apart from the amplifier 108 that is driving the loudspeaker 104.

In some examples the sensor 132 may be configured to measure a loudspeaker voltage and to provide the displacement-signalling 116 in accordance with the loudspeaker voltage.

In some examples, the echo controller 102 may be configured to add a measurement signal of a predetermined frequency to the system input signal 110 for the loudspeaker 104. The loudspeaker 104 may thereby be configured to receive the measurement signal as part of the system input signal 110.

The echo controller 102 may be further configured to measure a loudspeaker current at the predetermined frequency of the measurement signal. Thereby, the echo controller 102 may be configured to provide the displacement-signalling 116 in accordance with the loudspeaker current at the predetermined frequency.

In some examples, the measurement signal may comprise a pilot tone of predetermined frequency. The predetermined frequency may be outside of audible range, such that users of a device comprising the echo controller 102 cannot perceive the presence of the measurement signal. For example, the measurement signal may be a sine wave signal with a frequency of 22 kHz or of any other higher frequency. The sensor 132 may be configured to detect a representation of the measurement signal.

In some examples, the sensor 132 uses the measured current and the measured or estimated voltage voice coil signals to determine time-varying electrical impedance information of the loudspeaker 104. The impedance variations can be obtained by adding a measurement signal (for example a pilot tone with a frequency outside the audible range), and by estimating the impedance at that frequency by taking the ratio of voltage and current at that frequency. The loudspeaker diaphragm displacement can be derived from the time-varying impedance information.

In some examples the device 140 may comprise the loudspeaker 104 and a housing, or a sealed enclosure, coupled to the loudspeaker 104. The sensor 132 may be a pressure sensor or microphone which may be placed in the sealed enclosure of the loudspeaker 104 (for example its back volume). The sealed enclosure or housing may be configured to provide an interior volume for containing the sensor 132. The housing may be coupled to the back of the loudspeaker 104. Thereby, the housing may be configured to isolate the sensor 132 from acoustic signals originating from the external environment of the device 140. The output signal of a pressure sensor or microphone in the housing of the loudspeaker 104 may be related to the loudspeaker diaphragm displacement. Thereby, displacement-signalling 116 may be provided in accordance with the output signal of the pressure sensor or microphone.

Acoustic isolation of a microphone or pressure sensor may be achieved by providing a housing comprising a material configured to (i) absorb acoustic signals originating from the external environment of the device 140; and/or (ii) reflect acoustic signals originating from the external environment of the device 140. By reflecting and/or absorbing acoustic signals originating from the external environment of the device 140, the housing may attenuate those acoustic signals to a sufficient extent that the sensor 132 may be considered to be acoustically isolated from the external environment of the device 140. However, since the movement of the diaphragm of the loudspeaker may create acoustic signals supplied both in a forward direction, into the external environment of the device 140 and in a rearward direction, into the interior volume of the housing, the sensor may thereby be configured to provide displacement-signalling representative of the behaviour of the loudspeaker diaphragm.

In some examples, the housing may be configured to form a sealed enclosure for the rear of the loudspeaker 104. If the sensor 132 is placed within the sealed enclosure then it may be acoustically isolated from the external environment. The signal that is registered by the sensor 132 is not the same as the acoustical signal (provided by the loudspeaker in the forwards direction) because of the rearward radiation of the loudspeaker, but the changes in volume: as the diaphragm moves in and out, it effectively changes the volume of the sealed enclosure. These movements in turn, cause differences in pressure, due to which the pressure sensor or microphone will register the changing pressure in the sealed enclosure. This pressure is related to the excursion of the diaphragm, not the acoustical pressure output. Thereby, signals representative of the pressure (related to the diaphragm displacement) may comprise displacement-signalling 116.

Another example of the sensor 132 is a motion sensor that is mounted on, or otherwise coupled to, the diaphragm of the loudspeaker 104. The output signal of the motion sensor will be related to the loudspeaker diaphragm displacement. Thereby, displacement-signalling 116 may be provided in accordance with sensed motion of the diaphragm.

The echo controller 102 can also be used to determine a degree of non-linearity of the loudspeaker's 104 behaviour. Such a determination of the extent of the deviation away from linearity can be made by comparison of the system input signal 110 with the displacement signalling 116. The greater the deviation of the displacement signalling 116 from a linear representation of the system input signal 110 the greater the extent of the non-linearity of the loudspeaker's behaviour.

In some examples, the echo-cancelled-signal 118 may be formed by a relatively simple combination of the cancellation-signal with the received signal 114, such as by simply adding the signals or by subtracting the cancellation-signal from the received signal.

In other examples the application or determination of the cancellation-signal may be more complex. For example, the received signal 114 may be modified according to a formula, algorithm or according to information held in a database or look-up table. Such processing of the received signal may be in accordance with one or more echo-cancellation-parameters. For example, the parameters may be variables in the formula or algorithm, or may determine which information in the database or look-up table is used to support the processing. Values of these parameters may be determined in accordance with the cancellation-signal, or in accordance with the displacement-signalling 116 or in accordance with a determined degree of non-linearity of the behaviour of the loudspeaker 104. The parameters for the operation of the AEC module 130 may be adjusted accordingly, as the degree of non-linearity of the behaviour of the loudspeaker changes over time. In the presence of harsh nonlinearities (that is where the amount of non-linear behaviour of the loudspeaker 104 is high, at least in one or more frequency bands), the AEC 130 can for example be configured to reduce the echo more aggressively, at the risk of attenuating portions of the desired speech, or vice versa.

In some examples a system according to the present disclosure may comprise:
- an input audio signal (such as the system input signal 110) or associated terminal
- an amplifier 108 and loudspeaker 104
- a microphone 106
- a sensor 132 that measures (directly or indirectly) the behaviour of the loudspeaker 104 (e.g., the diaphragm displacement, or the time-varying electrical impedance)
- an acoustic echo canceller 130 which uses the microphone signal 114, optionally the input audio signal and the sensor output signal (the displacement signalling 116) to cancel the echo component from the microphone signal 114.

In some examples an electronic device may comprise a loudspeaker and an echo controller of the present disclosure. The present disclosure may be used in communications systems such as mobile phones, smartphones, smart watches, laptop computers, tablets and other portable computing devices. It is especially useful in communications systems where small loudspeakers (microspeakers) are used, since such loudspeakers may generate many nonlinearities in such devices.

FIG. 2 shows a method 200 of controlling an echo, the method for use with a microphone and a device comprising a loudspeaker. The method 200 comprises a first step 202 of a sensor providing displacement-signalling representative of a displacement of a diaphragm of the loudspeaker. As discussed above, the sensing capabilities of the sensor are isolated from an external environment of the device.

The method comprises a second step 204 of determining a cancellation-signal based on the displacement-signalling; wherein the cancellation-signal is for adapting a received-signal provided by the microphone to determine an echo-cancelled-signal.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An echo controller, for use with a microphone and a device comprising a loudspeaker, the echo controller comprising:
   a sensor with sensing capabilities configured to provide displacement signaling representative of a displacement of a diaphragm of the loudspeaker, wherein the sensing capabilities of the sensor are isolated from an external environment of the device; and
   a cancellation block configured to determine a cancellation-signal based on the displacement signaling,
   wherein an echo-cancelled-signal is formed by adding the cancellation-signal to or subtracting the cancellation-signal from a received signal,
   wherein the cancellation-signal is computed independent of computing a model of the loudspeaker's performance, and
   wherein the sensor is configured to measure a loudspeaker current flowing into a loudspeaker voice coil and to provide the displacement signaling in accordance with the loudspeaker current.

2. The echo controller of claim 1, wherein the cancellation block is configured to:
   receive a driver signal for the loudspeaker, and
   determine the cancellation-signal in accordance with the driver signal.

3. The echo controller of claim 1, wherein the cancellation block is also configured to determine the cancellation-signal in accordance with the received signal.

4. The echo controller of claim 1, wherein the sensor is configured to measure a loudspeaker voltage and to provide the displacement-signaling in accordance with the loud speaker voltage.

5. The echo controller of claim 1 further configured to introduce a measurement signal of a predetermined frequency into an input signal for the loudspeaker, measure a measured-signal in a frequency band comprising the predetermined frequency, and provide the displacement signaling in accordance with the measured-signal.

6. The echo controller of claim 5, wherein the measured signal is representative of one or more of:
   a loudspeaker current;
   a loudspeaker voltage;
   an acoustic signal; and
   a pressure signal.

7. The echo controller of claim 5, wherein the measurement signal comprises a pilot tone of predetermined frequency.

8. The echo controller of claim 1, further comprising an echo-reduction block configured to determine the echo cancelled-signal in accordance with the received-signal and the cancellation-signal.

9. The echo controller of claim 2, wherein the cancellation-signal is representative of a departure from linearity of the received-signal with respect to the driver signal.

10. The echo controller of claim 1, further configured to determine a parameter in accordance with the displacement signaling, wherein the parameter is for adapting one or more of an algorithm, a formula, a database and a look-up table, for processing:
the received-signal, provided by the microphone, to determine the echo-cancelled-signal; and/or the displacement signaling to determine the cancellation signal.

11. The echo controller of claim 1, wherein the cancellation-signal is configured to be representative of an acoustic output of the loudspeaker, the received signal comprises
information representative of the acoustic output, and the echo-cancelled-signal is determined to comprise a reduced intensity representation of the acoustic output compared to the received signal.

12. A device comprising a loudspeaker and the echo controller of claim 1.

13. The device of claim 12, further comprising a housing coupled to the loudspeaker and configured to provide an interior volume containing the sensor, wherein the sensor is a microphone or a pressure sensor and the housing is configured to isolate the sensor from acoustic signals originating from the external environment of the device, and wherein the housing may comprise a material configured to one or more of:
absorb acoustic signals originating from the external environment of the housing; and reflect acoustic signals originating from the external environment of the housing.

* * * * *